(12) United States Patent
Johansson et al.

(10) Patent No.: US 10,662,894 B2
(45) Date of Patent: *May 26, 2020

(54) METHOD FOR CONTROLLING THE TEMPERATURE OF A WASTE HEAT RECOVERY SYSTEM AND SUCH A WASTE HEAT RECOVERY SYSTEM

(71) Applicant: Scania CV AB, Södertälje (SE)

(72) Inventors: Björn Johansson, Älvsjö (SE); Erik Höckerdal, Södertälje (SE); Ola Blom, Tullinge (SE)

(73) Assignee: Scania CV AB, Södertälje (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/072,835

(22) PCT Filed: Jan. 11, 2017

(86) PCT No.: PCT/SE2017/050018
§ 371 (c)(1),
(2) Date: Jul. 25, 2018

(87) PCT Pub. No.: WO2017/135864
PCT Pub. Date: Aug. 10, 2017

(65) Prior Publication Data
US 2019/0032597 A1  Jan. 31, 2019

(30) Foreign Application Priority Data

Feb. 4, 2016 (SE) ........................ 1650132

(51) Int. Cl.
*F02G 5/02* (2006.01)
*F01K 13/02* (2006.01)
(Continued)

(52) U.S. Cl.
CPC ............... *F02G 5/02* (2013.01); *B60W 10/06* (2013.01); *B60W 10/30* (2013.01); *B60W 50/00* (2013.01);
(Continued)

(58) Field of Classification Search
CPC ........ F01K 13/02; F01K 23/065; F01K 23/10; B60W 50/0097; H02K 7/1823; F01N 5/02; F05D 2260/62
(Continued)

(56) References Cited

U.S. PATENT DOCUMENTS 8,069,827 B2   12/2011   Watanabe et al.
8,881,523 B2   11/2014   Kasuya et al.
(Continued)

FOREIGN PATENT DOCUMENTS

DE   102015007104 A1   12/2015
EP   2224110 A1   9/2010
(Continued)

OTHER PUBLICATIONS

International Search Report for International Patent Application No. PCT/SE2017/050018 dated Mar. 15, 2017.
(Continued)

*Primary Examiner* — Thai Ba Trieu
*Assistant Examiner* — Dapinder Singh
(74) *Attorney, Agent, or Firm* — Moore & Van Allen PLLC; W. Kevin Ransom

(57) ABSTRACT

The invention relates to a method for controlling the temperature of a waste heat recovery system associated with a combustion engine, the waste heat recovery system comprising a working fluid circuit; at least one evaporator; an expander; a condenser and a pump arranged to pump the working fluid through the circuit, wherein the at least one evaporator is arranged for heat exchange between the work-
(Continued)

ing fluid and a heat source associated with the combustion engine, wherein the condenser of the waste heat recovery system is connected to a cooling system. The method comprises the steps of: determining if a combustion engine associated with the waste heat recovery system is about to be shut down; and controlling the temperature in the waste heat recovery system based on whether the combustion engine is about to be shut down or not.

18 Claims, 4 Drawing Sheets

(51) Int. Cl.
*F01K 23/06* (2006.01)
*F02G 5/00* (2006.01)
*F01K 23/10* (2006.01)
*B60W 50/00* (2006.01)
*B60W 10/30* (2006.01)
*B60W 10/06* (2006.01)
*F01K 9/00* (2006.01)

(52) U.S. Cl.
CPC .............. *F01K 9/003* (2013.01); *F01K 13/02* (2013.01); *F01K 23/065* (2013.01); *F01K 23/10* (2013.01); *F01K 23/101* (2013.01); *F02G 5/00* (2013.01); *Y02T 10/166* (2013.01)

(58) Field of Classification Search
USPC .................................................. 60/614, 618
See application file for complete search history.

(56) References Cited

U.S. PATENT DOCUMENTS

| | | | |
|---|---|---|---|
| 2006/0254276 A1 | 11/2006 | Sato et al. | |
| 2010/0236502 A1 | 9/2010 | Watanabe et al. | |
| 2012/0035829 A1 | 2/2012 | Mitani et al. | |
| 2015/0308318 A1 | 10/2015 | Gibble | |
| 2015/0333244 A1 | 11/2015 | Iriyama | |
| 2018/0319250 A1 | 11/2018 | McQuillen et al. | |
| 2018/0320609 A1 | 11/2018 | McQuillen et al. | |
| 2018/0320645 A1 | 11/2018 | McQuillen et al. | |
| 2019/0003419 A1* | 1/2019 | Patel | F02G 5/04 |
| 2019/0032597 A1 | 1/2019 | Johansson et al. | |
| 2019/0040764 A1* | 2/2019 | Johansson | F02G 5/02 |

FOREIGN PATENT DOCUMENTS

| | | |
|---|---|---|
| EP | 2320058 | 9/2010 |
| EP | 2824300 A1 | 1/2015 |
| JP | 2008169809 A | 7/2008 |
| JP | 2008185001 A | 8/2008 |
| JP | 2009173124 A | 8/2009 |
| JP | 2011012625 A | 1/2011 |
| JP | 2013113192 A | 6/2013 |
| WO | WO2011037526 | 6/2013 |
| WO | WO2014049412 A1 | 4/2014 |
| WO | WO2014098843 A1 | 6/2014 |

OTHER PUBLICATIONS

Written Opinion of the International Searching Authority for International Patent Application No. PCT/SE2017/050018 dated Mar. 15, 2017.
Swedish Search Report dated Aug. 10, 2015.
Scania CV AB, International Patent Application No. PCT/SE2017/050018, International Preliminary Report on Patentability, dated Aug. 7, 2018.
Scania CV AB, European Patent Application No. 17747865.8, Extended European Search Report, dated Aug. 7, 2019.

* cited by examiner

METHOD FOR CONTROLLING THE TEMPERATURE OF A WASTE HEAT RECOVERY SYSTEM AND SUCH A WASTE HEAT RECOVERY SYSTEM

CROSS-REFERENCE TO RELATED APPLICATION(S)

This application is a National Stage Application (filed under 35 § U.S.C. 371) of PCT/SE2017/050018, filed Jan. 11, 2017 of the same title, which, in turn claims priority to Swedish Application No. 1650132-2 filed Feb. 4, 2016 of the same title; the contents of each of which are hereby incorporated by reference.

FIELD OF THE INVENTION

The present invention relates to a method for controlling the temperature of a waste heat recovery system associated with a combustion engine of a vehicle, a waste heat recovery system, a vehicle comprising such a waste heat recovery system, a computer program and a computer program product according to the appended claims.

BACKGROUND OF THE INVENTION

Vehicle manufacturers are today striving to increase engine efficiency and reduce fuel consumption. This is specifically an issue for manufacturers of heavy vehicles, such as trucks and buses. One way of improving engine efficiency and fuel consumption is waste heat recovery. In vehicles with combustion engines some of the energy from the fuel is dissipated as heat through the exhaust pipes and the engine cooling system. By the use of a waste heat recovery system the heat from the exhaust gases may instead be used for example to heat various vehicle components or to produce mechanical work. Such mechanical work may for example be transferred to the powertrain and thus be used to propel the vehicle.

A waste heat recovery system typically comprises at least one heat exchanger transferring heat between a heat source, such as exhaust gases, and a working fluid. The heat transfer between the working fluid and the heat source is an exchange of energy resulting in a change in temperature. A waste heat recovery system may also be based on a Rankine cycle and thus comprise a working fluid, a pump for circulating the working fluid in a circuit, at least one evaporator (heat exchanger), an expansion device and a condenser. The working fluid in such waste heat recovery system is suitably in a liquid state to start with. The pump pressurizes the working fluid which is pumped through the evaporator. The working fluid is heated by for example exhaust gases led through the evaporator and the working fluid thereby evaporates. The vapour may subsequently be expanded in the expansion device. By means of the expansion device the recovered heat may thereby be converted into mechanical work. The vapour is thereafter cooled in the condenser, such that the working fluid is brought back to its initial liquid state. The condenser is thus typically connected to a cooling system, which could be part of the engine cooling system or a separate cooling system.

The operating temperature of waste heat recovery systems is normally quite high. The thermal inertia of the system could result in a high temperature even after the system has been shut down. Too high temperatures could damage the working fluid and other components of the waste heat recovery system. It is therefore important that the waste heat recovery system is cooled down before being shut down.

Document JP2009173124 A describes a method for avoiding overheating of an engine cooling medium used in an exhaust heat recovery device in a hybrid vehicle. The exhaust heat is used to heat the cooling medium by means of a heat exchanger. If the temperature of the cooling medium is above a threshold temperature when the vehicle is stopping and the combustion engine is turned off, the combustion engine is driven by an electric machine to an idling speed, such that the exhaust gas with a lower temperature is cooling the heat exchanger and thus the cooling medium.

SUMMARY OF THE INVENTION

Despite known solutions in the field, there is still a need to develop a method for controlling the temperature of a waste heat recovery system associated with a combustion engine, which optimizes engine efficiency, fuel consumption and driver comfort.

An object of the present invention is to achieve an advantageous method for controlling the temperature of a waste heat recovery system, which optimizes engine efficiency and fuel consumption.

Another object of the present invention is to achieve an advantageous method for controlling the temperature of a waste heat recovery system, which optimizes driver comfort.

Another object of the invention is to achieve an advantageous waste heat recovery system, which optimizes engine efficiency and fuel consumption.

A further object of the invention is to achieve an advantageous waste heat recovery system, which optimizes driver comfort.

The herein mentioned objects are achieved by a method for controlling the temperature of a waste heat recovery system, a waste heat recovery system, a vehicle, a computer program and a computer program product according to the independent claims.

According to an aspect of the present invention a method for controlling the temperature of a waste heat recovery system associated with a combustion engine is provided. The waste heat recovery system comprises a working fluid circuit; at least one evaporator; an expander; a condenser and a pump arranged to pump the working fluid through the circuit, wherein the at least one evaporator is arranged for heat exchange between the working fluid and a heat source associated with the combustion engine, wherein the condenser of the waste heat recovery system is connected to a cooling system. The method comprises the steps of:
determining if a combustion engine associated with the waste heat recovery system is about to be shut down; and
controlling the temperature in the waste heat recovery system based on whether the combustion engine is about to be shut down or not.

The waste heat recovery system may be associated with a combustion engine of a vehicle.

The waste heat recovery system is suitably based on the Rankine cycle, preferably an organic Rankine cycle. The working fluid is thus suitably organic, such as ethanol or R245fa. The waste heat recovery system is suitably adapted to recover waste heat from the heat source and converting the recovered energy to mechanical work. The waste heat recovery system based on the Rankine cycle is suitably configured such that the working fluid, suitably in a liquid state, is pumped through the evaporator. The working fluid is thereby heated by the heat source connected to the evaporator and the working fluid thus evaporates. The vapour is then expanded in the expander whereby mechanical work is produced. The mechanical work may for example be transferred to the crankshaft of the combustion engine and thus be used to propel the vehicle or the mechanical work may be used to drive for example a generator. The vapour is thereafter cooled in the condenser by heat exchange with a cooling fluid in the cooling system, such that the working fluid is brought back to its initial liquid state. The evaporator is suitably a heat exchanger connected to the heat source and the working fluid circuit. The waste heat recovery system may comprise a plurality of evaporators, each connected to a separate heat source.

The waste heat recovery system is typically operating mainly when the combustion engine is operating since the heat source is associated with the combustion engine. Thus, the waste heat recovery system should commonly be shut down when the combustion engine is turned off. The operating temperature of the waste heat recovery system is normally quite high and the thermal inertia of the waste heat recovery system results in a high temperature even after the system has been shut down. Such high temperatures could damage the working fluid and other components of the waste heat recovery system. It is therefore important that the waste heat recovery system is cooled down before being shut down. However, the efficiency of the waste heat recovery system is increased with evaporator temperature. The temperature of the evaporator should therefore be maintained as high as possible during normal operation. The waste heat recovery system should thus not be unnecessarily cooled down. By determining if the combustion engine associated with the system is about to be shut down and controlling the temperature in the waste heat recovery system based on whether the combustion engine is about to be shut down or not, the functionality of the waste heat recovery system is ensured and engine efficiency and fuel consumption is optimized. By determining if the combustion engine is about to shut down, the need for shutdown of the waste heat recovery system is predicted. The temperature in the waste heat recovery system is thus suitably controlled further based on the prediction of whether the waste heat recovery system is about to be shut down or not.

The method steps are suitably performed by means of a control unit connected to the combustion engine, the waste heat recovery system and the cooling system.

The step to determine if the combustion engine is about to be shut down suitably comprises to receive a shutdown signal from another vehicle system. The shutdown signal thus indicates that the combustion engine is about to be shut down and no signal would indicate that the combustion engine is not about to be shut down. The step to determine if the combustion engine is about to be shut down may comprise to determine if the vehicle is standing still, if the vehicle parking brake is activated, if the vehicle is at its final destination according to a navigation system and/or if the vehicle is at a required stop according to a tachograph. The step to determine if the combustion engine is about to be shut down may be based on the topography of the vehicle route. It might, for example, be desirable to turn off the combustion engine when the vehicle is rolling downhill. It may also be determined that the combustion engine is about to be shut down based on other vehicle operation factors.

According to an aspect of the invention the step to control the temperature in the waste heat recovery system comprises to control the heat source associated with the combustion engine. The heat source associated with the combustion engine may for example be exhaust gases from the combustion engine. The heat transfer between the working fluid and the heat source is an exchange of energy resulting in a change in temperature. Thus, the heat source is providing the energy entering the waste heat recovery system and the energy is leaving the waste heat recovery system as mechanical work via the expander and as heat via the condenser and the cooling system. The temperature in the waste heat recovery system thus depends on the amount of energy entering the system and the amount of energy leaving the system. By controlling the heat source the temperature in the waste heat recovery system may be increased or reduced.

According to an aspect of the invention the step to control the temperature in the waste heat recovery system comprises to maintain as high temperature as possible, if the combustion engine is not about to be shut down. This way, the temperature of the evaporator is maintained as high as possible and the efficiency of the waste heat recovery system is optimized during normal operation. By controlling the temperature in the waste heat recovery system such that it is maintained as high as possible when it is determined that the combustion engine will not be turned off, engine efficiency is optimized. If it is determined that the combustion engine is about to be shut down, it may also be determined how long the combustion engine is likely to be shut down. The temperature in the waste heat recovery system is thus suitably controlled based on whether the combustion engine is about to be shut down or not and if so, how long it is likely to be shut down. Thus, the step to control the temperature in the waste heat recovery system comprises to maintain as high temperature as possible, if the combustion engine is not about to be shut down or if the combustion engine is about to be shut down for a shorter time period than a minimum time period. The minimum time period is suitably a time period after which it may be necessary to shut down the waste heat recovery system. When the vehicle is standing still, there is a possibility that the combustion engine and thus the waste heat recovery system will be turned off and it might therefore be advantageous to reduce the temperature in the waste heat recovery system. However, when the vehicle is stopped at a stop sign or a traffic light the combustion engine is not necessarily turned off or it is only turned off for a short period of time and the waste heat recovery system therefore does not have to be shut down. The temperature of the waste heat recovery system should therefore be maintained as high as possible to achieve an as efficient heat exchange as possible when the vehicle is moving again.

According to an aspect of the invention the step to control the temperature in the waste heat recovery system comprises to reduce the temperature prior to combustion engine shutdown, if the combustion engine is about to be shut down. Suitably, the step to control the temperature in the waste heat recovery system comprises to reduce the temperature prior to combustion engine shutdown, if the combustion engine is about to be shut down for a time period longer than the minimum time period. When the combustion engine is turned off, the heat source no longer heats the evaporator but the thermal inertia of the evaporator means that the evaporator will maintain a very high temperature for a certain time. The temperature in the waste heat recovery system therefore needs to be reduced before the system is shut down. It is thus crucial that circulation of the working fluid in the waste heat recovery system and the cooling fluid in the cooling system is maintained until a safe temperature in the waste heat recovery system is reached. The cooling system connected to the condenser may be part of the combustion engine cooling system or a separate cooling system. The cooling fluid in the cooling system is circulated by a cooling pump, which may be driven by the combustion engine or by an electric machine. In the case where the cooling pump is driven by the combustion engine it is crucial that the waste heat recovery system is cooled down prior to engine shutdown, since the cooling pump will stop circulating the cooling fluid when the combustion engine is turned off. In the case where the cooling pump is driven by an electric machine the waste heat recovery system may be cooled down after engine shutdown. However, the driver will then have to wait until the waste heat recovery system has reached a sufficiently low temperature to be safely shut down. Also, if the waste heat recovery system is cooled down after engine shutdown, the electric machine driving the cooling pump will use energy from an energy storage such as a battery in the vehicle. This is not advantageous. By reducing the temperature in the waste heat recovery system prior to combustion engine shutdown, the driver comfort is increased since the waste heat recovery system may be shut down essentially at the same time as the combustion engine.

The cooling system connected to the condenser suitably comprises a cooling circuit, a cooling pump arranged to circulate a cooling fluid through the cooling circuit and a radiator arranged for cooling the cooling fluid. The cooling system may further comprise a bypass circuit, a first valve unit and a second valve unit. The first valve unit is suitably arranged to control the flow of cooling fluid through the radiator and the bypass circuit respectively. The second valve unit is suitably arranged to control the flow of cooling fluid passing through the condenser of the waste heat recovery system. By controlling the first valve unit and the second valve unit, the cooling fluid may be controlled to bypass the radiator and/or the condenser of the waste heat recovery system.

According to an aspect of the invention the step to reduce the temperature in the waste heat recovery system prior to engine shutdown, when the combustion engine is about to be shut down, comprises to control the heat source to bypass the evaporator if the temperature of the heat source is higher than the temperature of the evaporator. This way, the heat source will no longer heat the evaporator and the temperature of the evaporator, and thus the waste heat recovery system, will be reduced. However, if the temperature of the heat source is lower than the temperature of the evaporator, the heat source is suitably controlled to flow through the evaporator. This way, the heat source will cool the evaporator and the temperature in the waste heat recovery system will thereby be reduced. In the case where the heat source is exhaust gases from the combustion engine, the exhaust gases may be directed by a throttle to bypass the evaporator when the temperature of the exhaust gases is higher than the temperature of the evaporator and to flow through the evaporator when the temperature of the exhaust gases is lower than the evaporator temperature. This way, the temperature in the waste heat recovery system is reduced prior to combustion engine shutdown, when the combustion engine is about to be shut down. The cooling of the evaporator by means of the exhaust gases may be accelerated by increasing the combustion engine idling speed when the vehicle is standing still. By increasing the idling speed of the combustion engine the amount of the heat source passing through the evaporator will be increased and the temperature of the evaporator will be reduced more quickly.

According to an aspect of the invention the step to reduce the temperature in the waste heat recovery system prior to engine shutdown, when the combustion engine is about to be shut down, comprises to minimize the temperature of the cooling fluid in the cooling system. By minimizing the temperature of the cooling fluid, the heat exchange between the working fluid in the waste heat recovery system and the cooling fluid in the cooling system will be increased. The temperature of the waste heat recovery system will thereby be reduced. The temperature of the cooling fluid in the cooling system is suitably minimized by controlling the cooling system such that the radiator is used with full capacity. This may be done by increasing the flow of cooling fluid through the radiator, for example by controlling the first valve unit in the cooling system. The flow through the radiator may also be increased by increasing the combustion engine idling speed. When the vehicle is standing still the combustion engine is typically running with an idling speed. The cooling pump is suitably connected to the crankshaft of the combustion engine such that by increasing the idling speed of the combustion engine, the cooling pump will pump an increased amount of cooling fluid through the cooling circuit. This way, the flow through the radiator is increased and the temperature of the cooling fluid is minimized.

According to an aspect of the invention the step to reduce the temperature in the waste heat recovery system prior to engine shutdown, when the combustion engine is about to be shut down, comprises to increase the flow of cooling fluid through the condenser. By increasing the flow of cooling fluid through the condenser of the waste heat recovery system, the heat exchange between the working fluid and the cooling fluid is increased and the cooling of the working fluid is increased. The temperature of the waste heat recovery system is thereby reduced. The flow of cooling fluid through the condenser is suitably increased by controlling the second valve unit in the cooling system.

According to an aspect of the invention the step to reduce the temperature in the waste heat recovery system prior to engine shutdown, when the combustion engine is about to be shut down, comprises to increase the flow of working fluid through the circuit of the waste heat recovery system. By increasing the flow of working fluid through the circuit of the waste heat recovery system, the cooling down of the evaporator may be accelerated and the temperature in the waste heat recovery system is quickly reduced. The flow of working fluid is suitably increased by increasing the speed of the pump of the waste heat recovery system.

The various ways of reducing the temperature in the waste heat recovery system mentioned herein may be combined or used separately. For example, when a combustion engine shutdown has been predicted, the heat source may be controlled to reduce the temperature of the evaporator and the cooling system may at the same time be controlled to reduce the temperature of the cooling fluid. This way, an efficient way of reducing the temperature in the waste heat recovery system, prior to combustion engine shutdown, is achieved.

If the temperature in the waste heat recovery system is not too high, there is no need to reduce the temperature further prior to combustion engine shutdown. Thus, the temperature in the waste heat recovery system should be reduced only when the current temperature in the waste heat recovery system is above a critical temperature. The critical temperature may be between 100-150 degrees Celsius.

According to an aspect of the invention the temperature in the waste heat recovery system is reduced, such that a target temperature is reached. The target temperature is suitably below a normal operation temperature, and substantially corresponds to the critical temperature defined above. Therefore, the target temperature may be between 100-150 degrees Celsius. The target temperature is suitably a temperature desired for enabling a safe shutdown of the waste heat recovery system. The normal operation temperature in the waste heat recovery system is preferably between 200-300 degrees Celsius, and depends on the type of working fluid in the waste heat recovery system. The target temperature and the normal operation temperature are suitably associated with the working fluid immediately downstream of the evaporator or immediately downstream of the condenser.

According to an aspect of the invention the method comprises the step to determine in which vehicle performance mode the vehicle is operating. Such vehicle performance mode may be an economy mode, a normal mode or a power mode. Depending on the vehicle performance mode different aspects are considered when controlling the vehicle. For example, a vehicle operating in an economy mode is controlled such that the fuel consumption is minimized and a vehicle operating in a power mode is controlled such that the engine power is maximized. This is suitably considered when determining how to control the temperature in the waste heat recovery system. When operating in an economy mode the fuel consumption should be minimized and the temperature in the waste heat recovery system is therefore suitably reduced without increasing the combustion engine idling speed. Also, increasing the speed of the pump in the waste heat recovery system to increase the flow of working fluid may affect the fuel consumption and may therefore be avoided when operating in an economy mode. When operating in a power mode the cooling down of the waste heat recovery system may on the other hand be accelerated by increasing the combustion engine idling speed. Thus, the step to control the temperature in the waste heat recovery system is suitably further based on the vehicle performance mode the vehicle is operating in.

According to an aspect of the invention, shutdown of the combustion engine is delayed until the temperature of the waste heat recovery system is below a target temperature. In the case where it has been determined that the combustion engine is about to be shut down, the temperature in the waste heat recovery system is suitably reduced to a target temperature prior to the engine shutdown. The target temperature is suitably a desired temperature enabling a safe shut down of the waste heat recovery system. If engine shutdown is requested before the temperature in the waste heat recovery system has been reduced to the target temperature, the combustion engine may be controlled to maintain an idling speed until the target temperature is reached. When the target temperature has been reached the combustion engine is suitably automatically shut down. Engine shutdown may be requested by the driver of the vehicle manoeuvring an ignition key/button. Engine shutdown may alternatively be requested by a vehicle system, such as an engine control system in a hybrid vehicle. If the combustion engine is controlled to maintain the idling speed even when engine shutdown is requested, this is suitably indicated to the driver through a display or similar.

According to an aspect of the invention the step to maintain as high temperature as possible in the waste heat recovery system when the combustion engine is not about to be shut down, comprises to control the heat source to bypass the evaporator if the temperature of the heat source is lower than the temperature of the evaporator. If the vehicle is standing still the combustion engine is typically operating with an idling speed. The temperature of the heat source associated with the combustion engine is thereby lower than during normal operation. By controlling the heat source to bypass the evaporator when the temperature is lower than the temperature of the evaporator, the heat source will not cool the evaporator. The temperature of the waste heat recovery system will thereby be maintained as high as possible. However, if the temperature of the heat source is higher than the temperature of the evaporator, the heat source is suitably controlled to flow through the evaporator. This way, the heat source will heat the evaporator and the temperature in the waste heat recovery system will thereby be maintained as high as possible.

According to an aspect of the invention a waste heat recovery system associated with a combustion engine of a vehicle is provided. The waste heat recovery system comprises a working fluid circuit; at least one evaporator; an expander; a condenser and a pump arranged to pump the working fluid through the circuit, wherein the at least one evaporator is arranged for heat exchange between the working fluid and a heat source associated with the combustion engine, wherein the condenser of the waste heat recovery system is connected to a cooling system. The waste heat recovery system further comprises a control unit adapted to determine if a combustion engine associated with the system is about to be shut down; and control the temperature in the waste heat recovery system based on whether the combustion engine is about to be shut down or not.

The waste heat recovery system may comprise one or more evaporators/heat exchangers. The waste heat recovery system may for example comprise a recuperator arranged to pre-heat the working fluid before entering the evaporator. The waste heat recovery system may also comprise one or more condensers, such that cooling of the working fluid may be performed in multiple steps. Furthermore, the waste heat recovery system may comprise one or more expanders. The expander may be a turbine or a piston expander.

The vehicle system may be arranged in a hybrid vehicle. Such hybrid vehicle comprises an electric machine for propulsion, in addition to the combustion engine.

The cooling system suitably comprises a cooling circuit connected to the condenser of the waste heat recovery system, a cooling pump arranged to circulate a cooling fluid through the cooling circuit and a radiator arranged for cooling the cooling fluid. The cooling pump is suitably driven by the combustion engine. The cooling system may further comprise a bypass circuit, a first valve unit and a second valve unit. The first valve unit is suitably arranged to control the flow of cooling fluid through the radiator and the bypass circuit respectively. The second valve unit is suitably arranged to control the flow of cooling fluid passing through the condenser of the waste heat recovery system.

The control unit is suitably connected to the waste heat recovery system, the combustion engine and the cooling system. The control unit is suitably connected to the evaporator, the expander and the pump of the waste heat recovery system. The control unit is suitably connected to the cooling pump, the first valve unit and the second valve unit of the cooling system. The control unit may be the engine control unit or may comprise a plurality of different control units. A computer may be connected to the control unit.

The control unit is suitably adapted to determine if the combustion engine is about to be shut down based on a received shutdown signal from another vehicle system. If the control unit receives the shutdown signal the combustion engine is about to be shut down and if the control unit does not receive a shutdown signal the combustion engine is not about to be shut down. The control unit may be adapted to determine if the combustion engine is about to be shut down based on if the vehicle is standing still, if the vehicle's parking brake is activated, if the vehicle is at its final destination according to a navigation system and/or if the vehicle is at a required stop based on a tachograph. The control unit may also be adapted to determine if the combustion engine is about to be shut down based on other vehicle operating factors.

The control unit is suitably adapted to identify that the vehicle is standing still based on signals from sensor devices connected to the driving wheels of the vehicle. The control unit may be adapted to determine if the vehicle is standing still by determining the engine speed. The engine speed is suitably an idling speed when the vehicle stands still. The idling speed associated with the combustion engine is suitably known and stored in the control unit.

The control unit is suitably adapted to control the temperature in the waste heat recovery system by controlling the heat source associated with the combustion engine.

The control unit is suitably adapted to determine the temperature of the evaporator, the heat source and the cooling fluid in the cooling system.

The control unit is suitably adapted to maintain as high temperature as possible in the waste heat recovery system, if the combustion engine is not about to be shut down. In order to maintain as high temperature in the waste heat recovery system as possible the control unit is suitably adapted to control the heat source to bypass the evaporator if the temperature of the heat source is lower than the temperature of the evaporator. The control unit is also adapted to control the heat source to flow through the evaporator if the temperature of the heat source is higher than the temperature of the evaporator in order to maintain as high temperature as possible.

The control unit is suitably adapted to reduce the temperature in the waste heat recovery system prior to combustion engine shutdown, if the combustion engine is about to be shut down. In order to reduce the temperature in the waste heat recovery system, the control unit is suitably adapted to control the heat source to bypass the evaporator if the temperature of the heat source is higher than the temperature of the evaporator. The control unit is also adapted to control the heat source to pass through the evaporator if the temperature of the heat source is lower than the temperature of the evaporator. The control unit is further adapted to minimize the temperature of the cooling fluid in the cooling system and/or increase the flow of cooling fluid through the condenser and/or increase the flow of working fluid through the circuit of the waste heat recovery system in order to reduce the temperature in the waste heat recovery system. In order to accelerate the temperature reduction in the waste heat recovery system, the control unit is suitably further adapted to increase the idling speed of the combustion engine and thereby increase the flow of cooling fluid and exhaust gases.

In the case where a combustion engine shutdown has been predicted, the control unit is suitably adapted to delay shutdown of the combustion engine until the temperature of the waste heat recovery system is below a target temperature.

Further objects, advantages and novel features of the present invention will become apparent to one skilled in the art from the following details, and also by putting the invention into practice. Whereas the invention is described below, it should be noted that it is not restricted to the specific details described. Specialists having access to the teachings herein will recognise further applications, modifications and incorporations within other fields, which are within the scope of the invention.

BRIEF DESCRIPTION OF THE DRAWINGS

For fuller understanding of the present invention and further objects and advantages of it, the detailed description set out below should be read together with the accompanying drawings, in which the same reference notations denote similar items in the various diagrams, and in which.

DETAILED DESCRIPTION OF THE DRAWINGS

Figure 1:
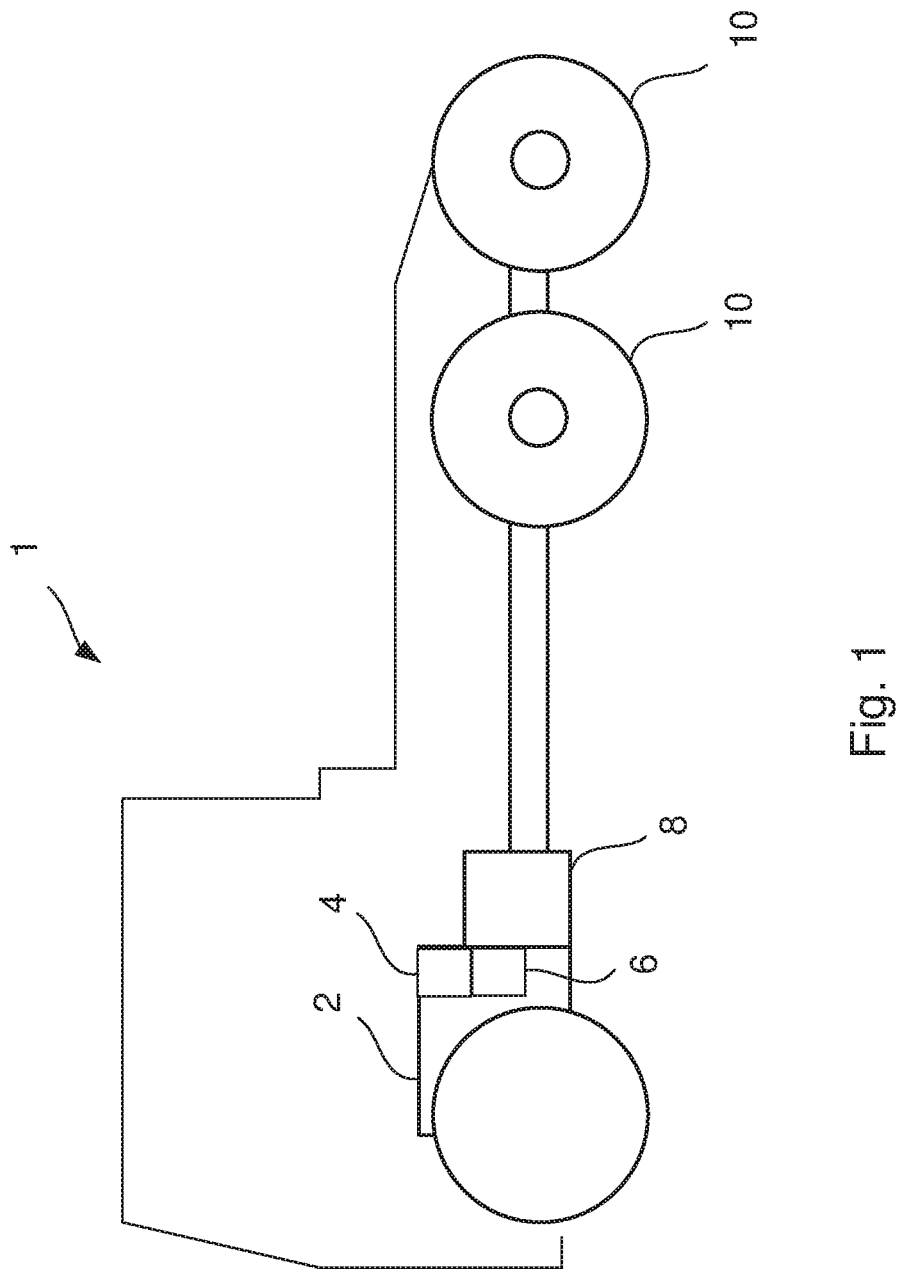
FIG. 1 schematically illustrates a vehicle according to an embodiment of the invention.

FIG. 1 schematically shows a side view of a vehicle 1 according to an embodiment of the invention. The vehicle 1 includes a combustion engine 2, a waste heat recovery system 4 associated with the combustion engine 2 and a cooling system 6 connected to the waste heat recovery system 4. The vehicle 1 further comprises a gearbox 8 connected to the driving wheels 10 of the vehicle 1. The vehicle 1 may be a heavy vehicle, e.g. a truck or a bus. The vehicle 1 may alternatively be a passenger car. The vehicle may be a hybrid vehicle comprising an electric machine (not shown) in addition to the combustion engine 2.

Figure 2:
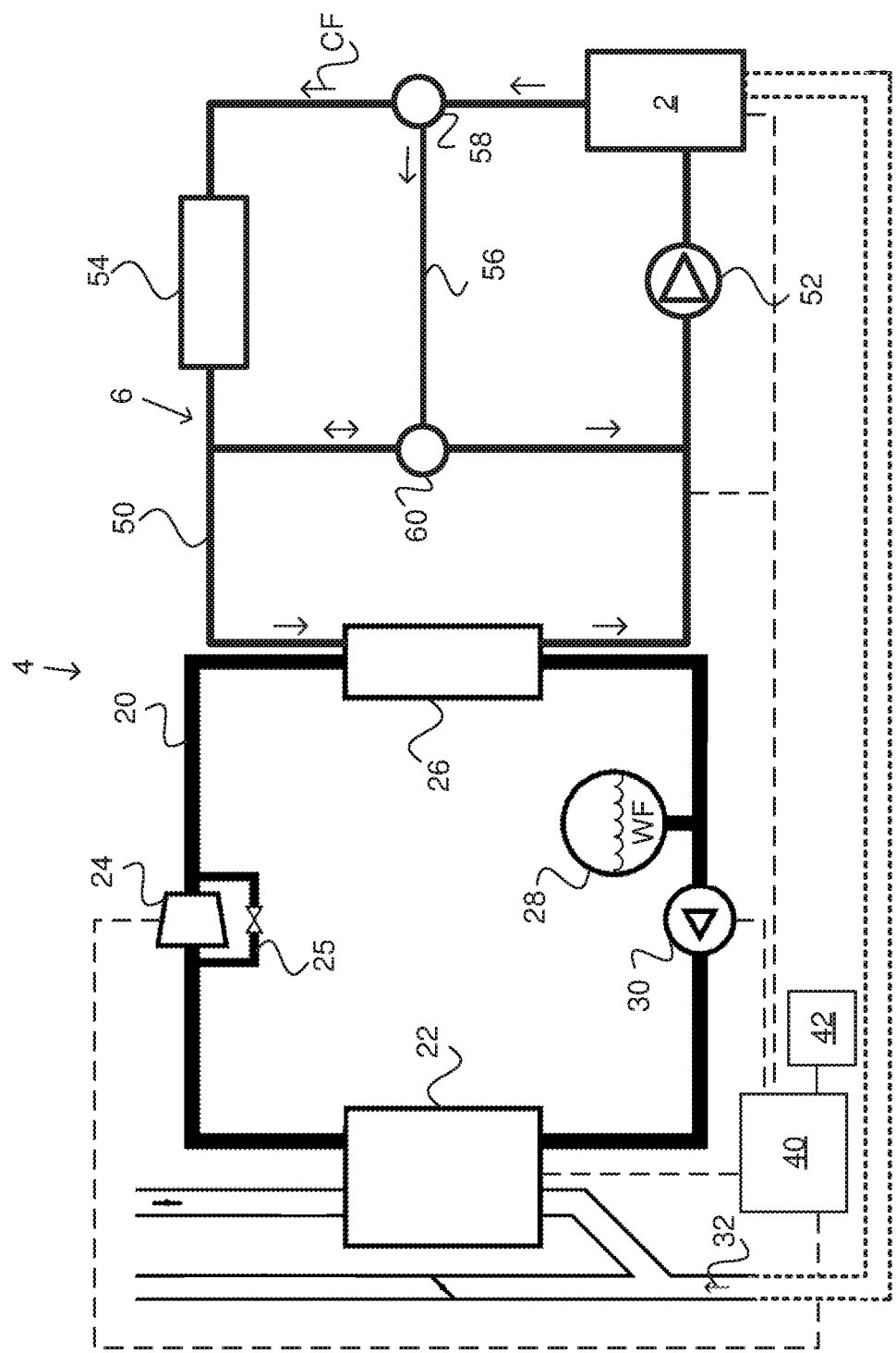
FIG. 2 schematically illustrates a waste heat recovery system according to an embodiment of the invention.

FIG. 2 schematically shows a waste heat recovery system 4 associated with a combustion engine 2 of a vehicle 1 according to an embodiment of the invention. The waste heat recovery system 4 is suitably arranged in a vehicle as described in FIG. 1.

The waste heat recovery system 4 comprises a working fluid circuit 20; an evaporator 22; an expander 24; a condenser 26; a reservoir 28 for a working fluid WF and a pump 30 arranged to pump the working fluid WF through the circuit 20, wherein the evaporator 22 is arranged for heat exchange between the working fluid WF and a heat source 32 associated with the combustion engine 2. The condenser 26 of the waste heat recovery system 4 is connected to a cooling system 6. The cooling system 6 may be a part of a combustion engine cooling system and may thus cool both the combustion engine 2 and the condenser 26 of the waste heat recovery system 4. Alternatively, the cooling system 6 is a separate cooling system. The waste heat recovery system 4 comprises a control unit 40 adapted to determine if a combustion engine 2 associated with the waste heat recovery system 4 is about to be shut down; and control the temperature in the waste heat recovery system 4 based on whether the combustion engine 2 is about to be shut down or not. This way, a waste heat recovery system 4 is achieved, which ensures the functionality of the waste heat recovery system 4 and optimizes the engine efficiency and fuel consumption. The heat source 24 connected to the evaporator 14 may be exhaust gases from the combustion engine 2, an exhaust gas recirculation system (EGR), the cooling fluid of the combustion engine 2, the combustion engine 2 itself or any other hot component associated with the combustion engine 2.

The cooling system 6 comprises a cooling circuit 50 connected to the condenser 26 of the waste heat recovery system 4, a cooling pump 52 arranged to circulate a cooling fluid CF through the cooling circuit 50 and a radiator 54 arranged for cooling the cooling fluid CF leaving the combustion engine 2. The cooling pump 52 is driven by the combustion engine 2. The cooling system 6 further comprises a bypass circuit 56, a first valve unit 58 and a second valve unit 60. The first valve unit 58 is suitably arranged to control the flow of cooling fluid CF through the radiator 54 and the bypass circuit 56 respectively. The second valve unit 60 is suitably arranged to control the flow of cooling fluid CF passing through the condenser 26 of the waste heat recovery system 4. The cooling fluid CF is herein illustrated as arrows also showing the flow direction of the cooling fluid CF through the cooling circuit 50.

The heat source 32 connected to the evaporator 22 is herein exemplified as exhaust gases from the combustion engine 2. The exhaust gases 32 are illustrated as an arrow in an exhaust pipe, wherein the exhaust gases 32 may be controlled to pass through the evaporator 22 or to bypass the evaporator 22. The waste heat recovery system 4 may comprise a plurality of evaporators 22, each connected to a different heat source 32. The evaporator 22 is suitably a heat exchanger connected to the heat source 32 and the working fluid circuit 20. The heat transfer between the working fluid WF and the heat source 32 is an exchange of energy resulting in a change in temperature. The waste heat recovery system 4 is suitably based on an organic Rankine cycle. The working fluid WF is thus suitably organic, such as ethanol or R245fa. The waste heat recovery system 4 is thus configured such that the liquid working fluid WF is pumped from low pressure to high pressure and enters the evaporator 22. The working fluid WF is thereby heated by the heat source 32 connected to the evaporator 22 and the working fluid WF is thus evaporated. The vapour is then expanded in the expander 24 whereby mechanical work is produced and the temperature and the pressure of the vapour is decreased. The mechanical work may for example be transferred to the crankshaft of the combustion engine 2 and thus be used to propel the vehicle 1 or the mechanical work may be used to drive for example a generator. The vapour thereafter enters the condenser 26 where condensation through heat exchange between the vapour and the cooling fluid CF of the cooling system 6 brings the working fluid WF back to its initial liquid state. Thus, the heat source 32 is providing the energy entering the waste heat recovery system 4 and the energy is leaving the waste heat recovery system 4 as mechanical work via the expander 24 and as heat via the cooling system 6 cooling the condenser 26. The temperature in the waste heat recovery system 4 thus depends on the amount of energy entering the system 4 and the amount of energy leaving the system 4.

It is crucial that the waste heat recovery system 4 is cooled down before being shut down. The thermal inertia of for example the evaporator 22 will otherwise cause a high temperature in the waste heat recovery system 4 after shutdown. A too high temperature in the waste heat recovery system 4 may damage the working fluid WF and other components of the waste heat recovery system 4. Since the cooling pump 52 is driven by the combustion engine 2 it is important that the waste heat recovery system 4 is cooled down prior to combustion engine shutdown. When the combustion engine 2 is turned off the cooling pump 52 will stop circulating the cooling fluid CF and the cooling of the condenser 26 will thereby stop. It is thus difficult to reduce the temperature in the waste heat recovery system 4 when the combustion engine 2 has been turned off.

Only vapour should enter the expander 24 and the waste heat recovery system 4 therefore comprises a bypass arrangement 25, such that in the case where the working fluid WF is still in a liquid state downstream of the evaporator 22, the working fluid WF is bypassing the expander 24 through the bypass arrangement 25.

The pump 30 pressurizing and circulating the working fluid WF is suitably electrically driven.

The waste heat recovery system 4 may comprise one or more evaporators/heat exchangers 22. The waste heat recovery system 4 may for example comprise a recuperator arranged to pre-heat the working fluid WF before entering the evaporator 22. The waste heat recovery system 4 may also comprise one or more condensers 26, such that cooling down of the working fluid WF may be performed in multiple steps. Furthermore, the waste heat recovery system 4 may comprise one or more expanders 24. The expander 24 may be a turbine or a piston expander.

The control unit 40 is arranged in connection with combustion engine 2, the waste heat recovery system 4 and the cooling system 6. The control unit may be arranged in connection with the evaporator 14, the expander 16 and the pump 22 of the waste heat recovery system 4. The control unit may be arranged in connection with the first valve unit 58 and the second valve unit 60 of the cooling system 6. A computer 42 may be connected to the control unit 40. The control unit 40 is further adapted to control the temperature in the waste heat recovery system 4 by controlling the heat source 32 associated with the combustion engine 2. The control unit 40 is adapted to determine the temperature of the evaporator 22, the heat source 32 and the cooling fluid CF in the cooling system 6. The control unit 40 is adapted to maintain as high temperature as possible in the waste heat recovery system 4, if it is determined that the combustion engine is not about to shut down.

The control unit 40 is adapted to reduce the temperature in the waste heat recovery system 4 prior to combustion engine shutdown, if it is determined that the combustion engine is about to shut down. The control unit 40 is further adapted to minimize the temperature of the cooling fluid CF in the cooling system 6 and/or increase the flow of cooling fluid CF through the condenser 26 and/or increase the flow of working fluid WF through the circuit 20 of the waste heat recovery system 4 in order to reduce the temperature in the waste heat recovery system 4. In order to accelerate the temperature reduction in the waste heat recovery system 4, the control unit 40 is further adapted to increase the idling speed of the combustion engine 2 and thereby increase the flow of cooling fluid CF and exhaust gases 32. The control unit 40 may also be adapted to delay combustion engine shutdown until the temperature of the waste heat recovery system 4 is below a target temperature.

Figure 3:
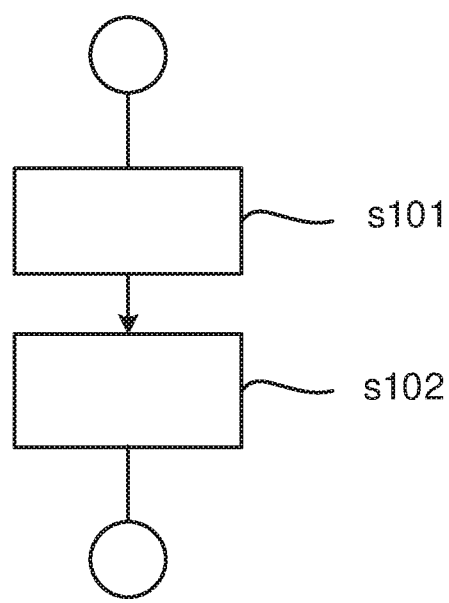
FIG. 3 schematically illustrates a flow chart for a method for controlling the temperature of a waste heat recovery system according to an embodiment of the invention.

FIG. 3 shows a flowchart for a method for controlling the temperature of a waste heat recovery system 4 associated with a combustion engine 2 of a vehicle 1. The waste heat recovery system 4 is suitably configured as described in FIG. 2. The method comprises the steps of; determining s101 if a combustion engine 2 associated with the waste heat recovery system 4 is about to be shut down; and controlling s102 the temperature in the waste heat recovery system 4 based on whether the combustion engine 2 is about to be shut down or not.

The operating temperature of the waste heat recovery system 4 is normally quite high and the thermal inertia of the waste heat recovery system 4 results in a high temperature even after the system 4 has been shut down. Such high temperatures could damage the working fluid WF and other components of the waste heat recovery system 4. It is therefore important that the waste heat recovery system 4 is cooled down before being shut down. However, the efficiency of the waste heat recovery system 4 is increased with the temperature of evaporator 22. The temperature of the evaporator 22 should therefore be maintained as high as possible during normal operation. The waste heat recovery system 4 should thus not be unnecessarily cooled down. By determining if the combustion engine 2 is about to be shut down and controlling the temperature in the waste heat recovery system 4 based on whether the combustion engine 2 is about to be shut down or not, the functionality of the waste heat recovery system 4 is ensured and engine efficiency and fuel consumption is optimized. By determining if the combustion engine 2 is about to shut down, a shutdown of the waste heat recovery system 4 is predicted. The temperature in the waste heat recovery system 4 is thus suitably controlled based on whether there is a need for the waste heat recovery system 4 to be shut down or not.

The method steps are suitably performed by means of the control unit 40 connected to the combustion engine 2, the waste heat recovery system 4 and the cooling system 6.

The step to determine s101 if the combustion engine 2 is about to be shut down is suitably based on a shutdown signal from another vehicle system. If the control unit 40 receives a shutdown signal the combustion engine 2 is about to be shut down and if the control unit 40 does not receive a shutdown signal the combustion engine 2 is not about to be shut down. The step to determine s101 if the combustion engine 2 is about to be shut down may comprise to determine if the vehicle 1 is standing still, if the vehicle parking brake is activated, if the vehicle 1 is at its final destination according to a navigation system and/or if the vehicle 1 is at a required stop according to a tachograph. The control unit 40 may also determine if the combustion engine 2 is about to be shut down based on other vehicle operation factors.

The step to control s102 the temperature in the waste heat recovery system 4 may comprise to control the heat source 32 associated with the combustion engine 2. The heat source 32 associated with the combustion engine 2 may for example be exhaust gases from the combustion engine 2. The heat source 32 is providing the energy entering the waste heat recovery system 4 and the energy is leaving the waste heat recovery system 4 as mechanical work via the expander 24 and as heat via the cooling system 6. The temperature in the waste heat recovery system 4 thus depends on the amount of energy entering the system 4 and the amount of energy leaving the system 4. By controlling the heat source 32 the temperature in the waste heat recovery system 4 may be increased or reduced.

The step to control s102 the temperature in the waste heat recovery system 4 suitably comprises to maintain as high temperature as possible, if the combustion engine is not about to be shut down. This way, the temperature of the evaporator 22 is maintained as high as possible and the efficiency of the waste heat recovery system 4 is optimized during normal operation. By controlling the temperature in the waste heat recovery system 4 such that it is maintained as high as possible when it is determined that the combustion engine 2 will not be turned off, engine efficiency is optimized.

The step to control s102 the temperature in the waste heat recovery system 4 suitably comprises to reduce the temperature prior to combustion engine shutdown, if the combustion engine is about to be shut down. The waste heat recovery system 4 is operating mainly when the combustion engine 2 is operating. Thus, the waste heat recovery system 4 is commonly shut down when the combustion engine 2 is turned off. When the combustion engine 2 is turned off, the heat source 32 no longer heat the evaporator 22 but the thermal inertia of the evaporator 22 means that the evaporator 22 will maintain a very high temperature for a certain time. The temperature of the waste heat recovery system 4 therefore needs to be reduced before the system 4 is shut down. It is thus crucial that circulation of the working fluid WF and the cooling fluid CF in the cooling system 6 is maintained until a safe temperature in the waste heat recovery system 4 is reached. When the cooling pump 52 of the cooling system 6 is driven by the combustion engine 2 it is crucial that the waste heat recovery system 4 is cooled down prior to combustion engine shutdown, since the cooling pump 52 will stop circulating the cooling fluid CF when the combustion engine 2 is turned off. Also, by reducing the temperature in the waste heat recovery system 4 prior to combustion engine shutdown, the driver comfort is increased since the waste heat recovery system 4 may be shut down essentially at the same time as the combustion engine 2.

The step to reduce the temperature in the waste heat recovery system 4 prior to engine shutdown, when the combustion engine is about to be shut down, suitably comprises to control the heat source 32 to bypass the evaporator 22 if the temperature of the heat source 32 is higher than the temperature of the evaporator 22. This way, the heat source 32 will no longer heat the evaporator 22 and the temperature of the evaporator 22, and thus the waste heat recovery system 4, will be reduced. The control unit 40 suitably determines the temperature of the evaporator 22 and the heat source 32. However, if the temperature of the heat source 32 is lower than the temperature of the evaporator 22, the heat source 32 is suitably controlled to flow through the evaporator 22. This way, the heat source 32 will cool the evaporator 22 and the temperature in the waste heat recovery system 4 will thereby be reduced. The cooling of the evaporator 22 by means of the heat source 32 may be accelerated by increasing the combustion engine idling speed. By increasing the idling speed of the combustion engine 2 the amount of the heat source 32 passing through the evaporator 22 will be increased and the temperature of the evaporator 22 will be reduced more quickly.

The step to reduce the temperature in the waste heat recovery system 4 prior to engine shutdown, when the combustion engine is about to be shut down, suitably comprises to minimize the temperature of the cooling fluid CF in the cooling system 6. By minimizing the temperature of the cooling fluid CF, the heat exchange between the working fluid WF in the waste heat recovery system 4 and the cooling fluid CF will be increased. The temperature of the waste heat recovery system 4 will thereby be reduced. The temperature of the cooling fluid CF in the cooling system 6 is suitably minimized by controlling the cooling system 6 such that the radiator 54 is used with full capacity. This may be done by increasing the flow of cooling fluid CF through the radiator 54, for example by controlling the first valve unit 58 in the cooling system 6. The flow through the radiator 54 may also be increased by increasing the engine idling speed. When the vehicle 1 is standing still the combustion engine 2 is typically running with an idling speed. The cooling pump 52 is suitably connected to the crankshaft of the combustion engine 2 such that by increasing the idling speed of the combustion engine 2, the cooling pump 52 will pump an increased amount of cooling fluid CF through the cooling circuit 50. This way, the flow through the radiator 54 is increased and the temperature of the cooling fluid CF is minimized.

The step to reduce the temperature in the waste heat recovery system 4 prior to engine shutdown, when the combustion engine is about to be shut down, suitably comprises to increase the flow of cooling fluid CF through the condenser 26. By increasing the flow of cooling fluid CF through the condenser 26 of the waste heat recovery system 4, the heat exchange between the working fluid WF and the cooling fluid CF is increased and the cooling of the working fluid WF is increased. The temperature of the waste heat recovery system 4 is thereby reduced. The flow of cooling fluid CF through the condenser 26 is suitably increased by controlling the second valve unit 60 in the cooling system 6.

According to an aspect of the invention the step to reduce the temperature in the waste heat recovery system 4 prior to engine shutdown, when the combustion engine is about to be shut down, comprises to increase the flow of working fluid WF through the circuit 20 of the waste heat recovery system 4. By increasing the flow of working fluid WF through the circuit 20 of the waste heat recovery system 4, the evaporator 22 may be cooled by the working fluid WF with increased speed and the temperature of the waste heat recovery system 4 is quickly reduced. The flow of working fluid WF is suitably increased by increasing the speed of the pump 30 of the waste heat recovery system 4.

The method may comprise the step to determine in which vehicle performance mode the vehicle 1 comprising the vehicle system 10 is operating. Such vehicle performance mode may be an economy mode, a normal mode or a power mode. Suitably, the step of controlling the temperature in the waste heat recovery system 4 is further based on the vehicle performance mode in which the vehicle 1 is operating. When operating in an economy mode the fuel consumption should be minimized and the temperature in the waste heat recovery system 4 is therefore suitably reduced without increasing the combustion engine idling speed. Also, increasing the speed of the pump 30 in the waste heat recovery system 4 to increase the flow of working fluid WF may affect the fuel consumption and may therefore be avoided when operating in an economy mode. When operating in a power mode the cooling down of the waste heat recovery system 4 may on the other hand be accelerated by increasing the combustion engine idling speed.

Suitably, shutdown of the combustion engine 2 is delayed until the temperature of the waste heat recovery system 4 is below a target temperature. In the case where it has been determined that the combustion engine 2 is about to be shut down, the temperature in the waste heat recovery system 4 is suitably reduced to a target temperature prior to the engine shutdown. The target temperature is suitably a desired temperature for safe shut down of the waste heat recovery system 4. If engine shutdown is requested before the temperature in the waste heat recovery system 4 has been reduced to the target temperature, the combustion engine 2 may be controlled to maintain an idling speed until the target temperature is reached. When the target temperature has been reached the combustion engine 2 is automatically shut down. Engine shutdown may be requested by the driver of the vehicle 1 manoeuvring an ignition key/button. Engine shutdown may alternatively be requested by a vehicle system, such as an engine control system in a hybrid vehicle. If the combustion engine 2 is controlled to maintain the idling speed even when the engine shutdown is requested, this is suitably indicated to the driver through a display or similar.

The step to maintain as high temperature as possible in the waste heat recovery system 4 when the combustion engine is not about to be shut down suitably comprises to control the heat source 32 to bypass the evaporator 22 if the temperature of the heat source 32 is lower than the temperature of the evaporator 22. When the vehicle 1 is standing still the combustion engine 2 is typically operating with an idling speed. The temperature of the heat source 32 associated with the combustion engine 2 is thereby lower than during normal operation. By controlling the heat source 32 to bypass the evaporator 22 when the temperature is lower than the temperature of the evaporator 22 the heat source 32 will not cool the evaporator 22. The temperature of the waste heat recovery system 4 will thereby be maintained as high as possible. However, if the temperature of the heat source 32 is higher than the temperature of the evaporator 22, the heat source 32 is suitably controlled to flow through the evaporator 22. This way, the heat source 32 will heat the evaporator 22 and the temperature in the waste heat recovery system 4 will thereby be maintained as high as possible.

Figure 4:
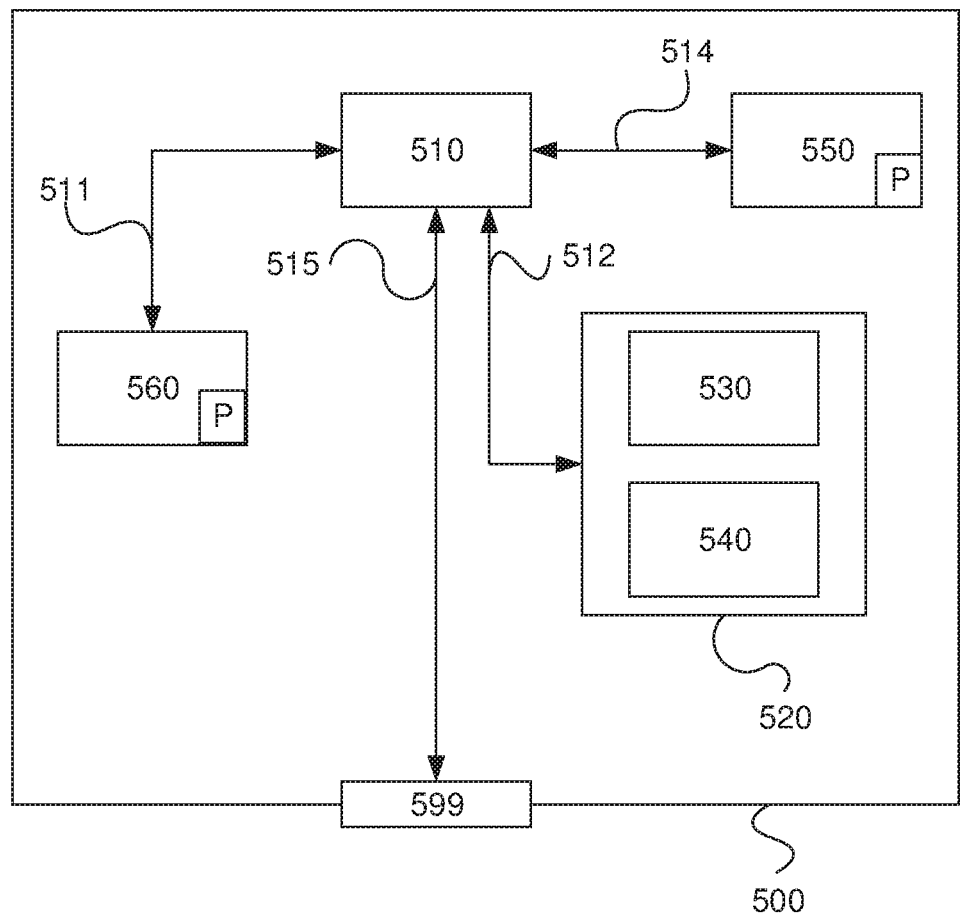
FIG. 4 schematically illustrates a control unit or computer according to an embodiment of the invention.

FIG. 4 schematically illustrates a device 500. The control unit 40 and/or computer 42 described with reference to FIG. 2 may in a version comprise the device 500. The term "link" refers herein to a communication link which may be a physical connection such as an optoelectronic communication line, or a non-physical connection such as a wireless connection, e.g. a radio link or microwave link. The device 500 comprises a non-volatile memory 520, a data processing unit 510 and a read/write memory 550. The non-volatile memory 520 has a first memory element 530 in which a computer program, e.g. an operating system, is stored for controlling the function of the device 500. The device 500 further comprises a bus controller, a serial communication port, I/O means, an ND converter, a time and date input and transfer unit, an event counter and an interruption controller (not depicted). The non-volatile memory 520 has also a second memory element 540.

There is provided a computer program P which comprises routines for a method for controlling the temperature of a waste heat recovery system 4 according to the invention. The computer program P comprises routines for identifying that a vehicle 1 comprising the vehicle system 10 is standing still. The computer program P comprises routines for determining if the combustion engine 2 is about to be shut down. The computer program P comprises routines for controlling the temperature in the waste heat recovery system 4 based on whether the combustion engine 2 is about to be shut down or not. The computer program P comprises routines for controlling the temperature in the waste heat recovery system 4 by controlling the heat source 32 associated with the combustion engine 2. The program P may be stored in an executable form or in a compressed form in a memory 560 and/or in a read/write memory 550.

Where the data processing unit 510 is described as performing a certain function, it means that the data processing unit 510 effects a certain part of the program stored in the memory 560 or a certain part of the program stored in the read/write memory 550.

The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above.

Parts of the methods herein described may be effected by the device 500 by means of the data processing unit 510 which runs the program stored in the memory 560 or the read/write memory 550. When the device 500 runs the program, methods herein described are executed.

The foregoing description of the preferred embodiments of the present invention is provided for illustrative and descriptive purposes. It is not intended to be exhaustive or to restrict the invention to the variants described. Many modifications and variations will obviously be apparent to one skilled in the art. The embodiments have been chosen and described in order best to explain the principles of the invention and its practical applications and hence make it possible for specialists to understand the invention for various embodiments and with the various modifications appropriate to the intended use.

The invention claimed is:

1. A method for controlling the temperature in a waste heat recovery system associated with a combustion engine, the waste heat recovery system comprising a working fluid circuit; at least one evaporator; an expander; a condenser and a pump arranged to pump the working fluid through the working fluid circuit, wherein the at least one evaporator is arranged for heat exchange between the working fluid and a heat source associated with the combustion engine, wherein the condenser of the waste heat recovery system is connected to a cooling system, said method comprising, via at least one control unit:
Monitoring, via at least one sensor, at least one of a current operation and an expected operation of the combustion engine associated with the waste heat recovery system;
predicting that a combustion engine associated with the waste heat recovery system is about to be shut down, based on said monitored at least one of the current operation and the expected operation; and
controlling a temperature in the waste heat recovery system based on the prediction that the combustion engine is about to be shut down.

2. The method according to claim 1, wherein controlling the temperature in the waste heat recovery system comprises controlling the heat source associated with the combustion engine.

3. The method according to claim 1, wherein controlling the temperature in the waste heat recovery system further comprises maintaining as high a temperature as possible, if the combustion engine is predicted to not about to be shut down.

4. The method according to claim 3, wherein maintaining as high a temperature as possible in the waste heat recovery system comprises controlling the heat source to bypass the evaporator if a temperature of the heat source is lower than a temperature of the evaporator.

5. The method according to claim 3, wherein maintaining as high a temperature as possible in the waste heat recovery system comprises controlling the heat source to flow through the evaporator if a temperature of the heat source is higher than a temperature of the evaporator.

6. The method according to claim 1, wherein controlling the temperature in the waste heat recovery system comprises reducing the temperature prior to combustion engine shutdown.

7. The method according to claim 6, wherein reducing the temperature in the waste heat recovery system comprises controlling the heat source to bypass the evaporator if a temperature of the heat source is higher than a temperature of the evaporator.

8. The method according to claim 6, wherein reducing the temperature in the waste heat recovery system comprises controlling the heat source to flow through the evaporator if a temperature of the heat source is lower than a temperature of the evaporator.

9. The method according to claim 6, wherein reducing the temperature in the waste heat recovery system comprises increasing a flow of cooling fluid in the cooling system flowing through the condenser.

10. The method according to claim 6, wherein reducing the temperature in the waste heat recovery system comprises increasing a flow of working fluid through the circuit of the waste heat recovery system.

11. The method according to claim 6, comprising delaying a shutdown of the combustion engine until the temperature of the waste heat recovery system is below a target temperature.

12. The method according to claim 1, wherein monitoring further comprises monitoring both a current and an expected operation of the combustion engine associated with the waste heat recovery system.

13. A waste heat recovery system associated with a combustion engine, the waste heat recovery system comprising:
a working fluid circuit;
at least one evaporator arranged for heat exchange between a working fluid and a heat source associated with a combustion engine;
an expander;
a condenser connected to a cooling system;
a pump arranged to pump the working fluid through the circuit; and
a control unit including executable instructions stored in a non-transitory computer readable medium, which when executed are configured to:
monitor, via at least one sensor, at least one of a current operation and an expected operation of the combustion engine associated with the waste heat recovery system;
predict that a combustion engine associated with the waste heat recovery system is about to be shut down, based on said monitored at least one of the current operation and the expected operation; and
control a temperature in the waste heat recovery system based on the prediction that the combustion engine is about to be shut down.

14. The waste heat recovery system according to claim 13, wherein the executable instructions associated with said control unit are further configured to monitor both a current and an expected operation of the combustion engine associated with the waste heat recovery system.

15. A vehicle comprising a waste heat recovery system associated with a combustion engine, the waste heat recovery system comprising:
a working fluid circuit;
at least one evaporator arranged for heat exchange between a working fluid and a heat source associated with a combustion engine;
an expander;
a condenser connected to a cooling system;
a pump arranged to pump the working fluid through the circuit; and
a control unit including executable instructions stored in a non-transitory computer readable medium, which when executed are configured to:
monitor, via at least one sensor, at least one of a current operation and an expected operation of the combustion engine associated with the waste heat recovery system;

predict that a combustion engine associated with the waste heat recovery system is about to be shut down, based on said monitored at least one of the current operation and the expected operation; and control a temperature in the waste heat recovery system based on the prediction that the combustion engine is about to be shut down.

16. The vehicle according to claim 15, wherein the executable instructions associated with said control unit are further configured to monitor both a current and an expected operation of the combustion engine associated with the waste heat recovery system.

17. A computer program product comprising computer program code stored on a non-transitory computer-readable medium, said computer program code for controlling the temperature in a waste heat recovery system associated with a combustion engine, the waste heat recovery system comprising a working fluid circuit; at least one evaporator; an expander; a condenser and a pump arranged to pump the working fluid through the working fluid circuit, wherein the at least one evaporator is arranged for heat exchange between the working fluid and a heat source associated with the combustion engine, wherein the condenser of the waste heat recovery system is connected to a cooling system, said computer program code comprising computer instructions stored on the non-transitory computer-readable medium and configured, such that when accessed and performed by at least one control unit, to execute the following operations of:

monitoring, via at least one sensor, at least one of a current operation and an expected operation of the combustion engine associated with the waste heat recovery system;

predicting that a combustion engine associated with the waste heat recovery system is about to be shut down, based on said monitored at least one of the current operation and the expected operation; and controlling a temperature in the waste heat recovery system based on the prediction that the combustion engine is about to be shut down.

18. The computer program product according to claim 17, wherein monitoring further comprises monitoring both a current and an expected operation of the combustion engine associated with the waste heat recovery system.

* * * * *